(12) United States Patent
Helot

(10) Patent No.: US 11,921,932 B2
(45) Date of Patent: Mar. 5, 2024

(54) METHOD FOR OPERATING A DISPLAY AND OPERATING DEVICE, DISPLAY AND OPERATING DEVICE, AND MOTOR VEHICLE

(71) Applicant: AUDI AG, Ingolstadt (DE)

(72) Inventor: Jacques Helot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/251,653

(22) PCT Filed: May 27, 2019

(86) PCT No.: PCT/EP2019/063612
§ 371 (c)(1),
(2) Date: Dec. 11, 2020

(87) PCT Pub. No.: WO2019/238397
PCT Pub. Date: Dec. 19, 2019

(65) Prior Publication Data
US 2021/0278909 A1 Sep. 9, 2021

(30) Foreign Application Priority Data

Jun. 13, 2018 (DE) ............... 10 2018 209 400.4

(51) Int. Cl.
*G06F 3/01* (2006.01)
*B60K 35/00* (2006.01)
*G06F 3/04845* (2022.01)

(52) U.S. Cl.
CPC .............. *G06F 3/017* (2013.01); *B60K 35/00* (2013.01); *G06F 3/016* (2013.01);
(Continued)

(58) Field of Classification Search
CPC ........ G06F 3/017; G06F 3/016; G06F 3/0425; G06F 3/011; B60K 37/06; B60K 35/00;
(Continued)

(56) References Cited

U.S. PATENT DOCUMENTS

2004/0095315 A1   5/2004  Montellese
2006/0139711 A1*  6/2006  Leister ................ G03H 1/2294
                                                       359/9
(Continued)

FOREIGN PATENT DOCUMENTS

DE   10 2011 112 448 A1   3/2013
DE   10 2015 009 031 A1   1/2017
(Continued)

OTHER PUBLICATIONS

Notification of Transmittal of Translation of International Preliminary Report on Patentability dated Dec. 24, 2020, with International Preliminary Report on Patentability (Form PCT/IPEA/409); dated Jan. 21, 2020, in International Patent Application No. PCT/EP2019/063612, including English language translation (22 pages total).
(Continued)

*Primary Examiner* — Christopher E Leiby
(74) *Attorney, Agent, or Firm* — STAAS & HALSEY LLP

(57) ABSTRACT

A control device of a display and operating device specifies a graphical configuration of a display element to be displayed by the display device. Based on the specified graphical configuration, at least one light wave parameter for a respective light wave of a group of light waves is ascertained. A totality of the light wave parameters describes an interference pattern which describes an at least partial superposition of the light waves for generating an image representation of the display element. An interference pattern signal which describes the totality of the ascertained light wave parameters is generated and the generated interference pattern signal is transferred to an interference output device of the display and operating device. Based on the transferred interference pattern signal, the interference output device
(Continued)

generates a light wave interference, and an output of a real image of the display element is displayed.

15 Claims, 4 Drawing Sheets

(52) U.S. Cl.
CPC .. *G06F 3/04845* (2013.01); *B60K 2370/1464* (2019.05); *B60K 2370/1531* (2019.05); *B60K 2370/166* (2019.05)

(58) Field of Classification Search
CPC ........ B60K 2370/1531; B60K 2370/29; B60K 2370/166; B60K 2370/1464; G03H 1/0005; G03H 2001/0061
See application file for complete search history.

(56) References Cited

U.S. PATENT DOCUMENTS

| | | | |
|---|---|---|---|
| 2011/0320969 A1 | 12/2011 | Hwang et al. | |
| 2013/0120247 A1* | 5/2013 | Imai | G03B 35/24 345/156 |
| 2014/0160100 A1* | 6/2014 | Edgren | G06T 15/60 345/207 |
| 2015/0007025 A1* | 1/2015 | Sassi | G06F 3/0488 715/702 |
| 2020/0057546 A1* | 2/2020 | Zhao | G06F 3/017 |

FOREIGN PATENT DOCUMENTS

| | | |
|---|---|---|
| DE | 10 2015 213 424 A1 | 1/2017 |
| DE | 10 2016 208 095 A1 | 11/2017 |
| DE | 10 2016 208 096 A1 | 11/2017 |
| DE | 10 2017 116 008 A1 | 2/2018 |
| DE | 10 2016 120 995 A1 | 5/2018 |
| DE | 10 2018 209 400.4 | 6/2018 |
| EP | 3 139 250 A1 | 3/2017 |
| WO | 2013/032076 A1 | 3/2013 |
| WO | PCT/EP2019/063612 | 5/2019 |

OTHER PUBLICATIONS

International Search Report (Forms PCT/ISA/210; PCT/ISA/220); dated Jul. 17, 2019, in International Patent Application No. PCT/EP2019/063612.
Written Opinion (Form PCT/ISA/237); dated Jul. 17, 2019, in International Patent Application No. PCT/EP2019/063612.
Examination Report (Form PCT/IPEA/408); dated Oct. 24, 2019, in International Patent Application No. PCT/EP2019/063612.
International Report regarding Patentability (Form PCT/IPEA/416); dated Jan. 21, 2020, in International Patent Application No. PCT/EP2019/063612, including Transmittal Letter and Amended Claims, with translation of amended claims.
German Examination Report dated Feb. 26, 2019, in German Patent Application No. 10 2018 209 400.4.
Chinese Office Action issued in parallel Chinese Application No. 201980046451.X dated Apr. 29, 2023.

* cited by examiner

METHOD FOR OPERATING A DISPLAY AND OPERATING DEVICE, DISPLAY AND OPERATING DEVICE, AND MOTOR VEHICLE

CROSS REFERENCE TO RELATED APPLICATIONS

This application is a U.S. national stage of International Application No. PCT/EP2019/063612, filed on May 27, 2019. The International Application claims the priority benefit of German Application No. 10 2018 209 400.4 filed on Jun. 13, 2018. Both the International Application and the German Application are incorporated by reference herein in their entirety.

BACKGROUND

Described herein is a method for operating a display and operating apparatus (device), i.e. for operating an appliance or an appliance component for displaying image content. Also described herein is a corresponding display and operating apparatus (device), by use of which two-dimensional real images, as well as three-dimensional real images, can be displayed. Also described herein is a motor vehicle including such a display and operating apparatus (device).

There is a steady increase in the number of vehicle settings and comfort systems, especially in motor vehicles. To operate a system, in particular a motor vehicle system, use is made of operating devices, i.e. appliances or appliance components for providing an operating action and for generating a corresponding operating signal for triggering a function. However, display apparatuses with a plurality of screens are desirable such that a user menu or information items or different image content, for example, are made accessible to the user and are visible to the user. In motor vehicles, the screens are usually installed in a center console and/or in a control panel, but also at other positions where applicable.

Modern combinations of display apparatuses and operating apparatuses for example have a touch-sensitive screen, a so-called "touchscreen", in this case. Touch-pads, i.e. touch-sensitive areas, are likewise frequently installed and an operating menu, for example, can be displayed by way of a screen that is spatially separated from the touchpad. These require a user to extend their hand to the touch-sensitive area or to the touch-sensitive screen.

Operating concepts on displays are always restricted to two dimensions or to planes. It is more difficult to find content if everything is on a plane. In the case of a concept based on planes, one is restricted to a certain number of planes. Moreover, screens with two planes are known, as is a mirror combination with a plurality of virtual planes.

Moreover, operation may not be very simple in some situations, for example because the screen or the touchpad is situated so far away from the user that the latter must for example bend to one side. However, it is desirable for the driver to be seated comfortably and as upright as possible, especially while driving in a motor vehicle.

German Patent Application No. 10 2015 213 424 A1 describes an operating system for operating at least one function in an interior of a vehicle. The operating system includes a representation generator which, following the activation of a representation region in the interior of the vehicle assigned to the at least one function, is configured for the holographic representation of at least one virtual operating element, assigned to the at least one function, in the representation region in the interior of the vehicle assigned to the at least one function.

German Patent Application No. 10 2011 112 448 A1 describes a method for providing a user interface, in which one or more graphical objects are represented on a display area of a touch-sensitive surface, an operating intent assignable to an operating region of the display area is captured in contactless fashion in a space in front of the display area in the direction of observation and an operating action is carried out by touching one of the graphical objects in the operating region of the display area.

United States Patent Application Publication No. 2011/0320969 A1 describes an appliance that processes a three-dimensional object. The appliance is able to interact with a user and uses a stereoscopic effect of a 3D user interface as information.

A stereoscopic method facilitates the reproduction of images with a spatial impression of depth, which are physically not present. Expressed differently, a two-dimensional stereogram can be facilitated by way of a stereoscopic method. To recognize the stereogram, the user requires an aid, 3D glasses, with the aid of which the two images are combined in the brain to provide a three-dimensional impression. Thus, the eye spacing of the observer plays a role in the case of a stereogram. Moreover, not every human is able to see such stereoscopic images. Expressed differently, such a stereogram can be blurred for many users and may even not be recognized under certain circumstances.

SUMMARY

Aspects of the disclosure include providing an easily recognizable and easily reachable operating element.

Aspects of the disclosure may be achieved by the example methods and the example apparatuses described herein. Advantageous developments are further described.

The method, apparatuses, and motor vehicle described herein are based on the concept of providing a real image of a display element by a superposition of a plurality of light waves. As a result, the real image is located in a space in front of a display area of a display and operating apparatus, and hence closer to a user of the display and operating apparatus. The method, apparatuses, and motor vehicle described herein allow a representation of both a two-dimensional body and a three-dimensional body, as a result of which an operating concept can be implemented in a more natural and intuitive fashion. In the case of such a display element, it is possible to place functions both on a front side and on a back or rear side of the displayed body, as a result of which a plurality of functions can be imaged in a small space. Such a display and operating apparatus allows a great amount of information to be shown in a small space. If the display and operating apparatus also includes an operating device or if the display and operating apparatus is coupled to such an operating device, it is possible to place and operate a plurality of functions in a small space. If the display element is an operating element, it is easily reachable by the driver and the latter need not move, or need only move a little, to the display and operating apparatus. This significantly increases safety while driving since the driver can remain comfortably seated even when operating the display element and has the best view of the road ahead. Moreover, this dispenses with the need of providing a solid body as an operating element, for example a pushbutton or a rotary/push controller, for example made of a plastic or of a metal, which the driver could inadvertently contact. In the case of gesture recognition, such a display element can also serve as a positioning aid for, for example, a hand.

Fast-moving images can be provided by the implementation of a light wave interference. On account of the omission of solid body operating elements, motor vehicle interiors have a more airy atmosphere. An example operating menu, provided by the method described herein, as a display element can be operated very clearly.

The method described herein for operating a display and operating apparatus, which can for example be a display and operating apparatus of a motor vehicle, includes the operations set forth below, which are carried out by a control device of the display and operating apparatus. Here, a control device is understood to refer to an appliance or an appliance component set up to receive and evaluate signals and to generate control signals. By way of example, the control device can be configured as a controller or control chip.

A graphical configuration of a display element to be displayed by the display and operating apparatus is specified. Here, a display element is an object to be displayed, for example an operating element. Expressed differently, the control device specifies, for example, an image of an operating element, for example an image of a rotary/push controller to be displayed.

At least one light wave parameter for a respective light wave of a group of light waves is ascertained in each case on the basis of the specified graphical configuration, wherein each of the light wave parameters describes a physical property of the respective light wave. By way of example, a light wave parameter can be a frequency, an amplitude or a wavelength of the light wave. Here, a totality of the light wave parameters describes an interference pattern which describes an at least partial superposition of at least two of the light waves or of light wave pairs or of light wave groups for generating an image representation of the display element to be displayed. Expressed differently, the interference pattern describes how a plurality of light waves are superposed in each case such that an image of the display element, i.e. a reproduction of the graphical configuration, arises from the interference arising as a result.

An interference pattern signal which describes the totality of the ascertained light wave parameters, i.e. which describes the interference pattern, is generated on the basis thereof. The generated interference pattern signal is output to an interference output device of the display and operating apparatus, i.e. to an appliance component or a component part for outputting at least one light wave.

The method furthermore includes the operation of generating a light wave interference on the basis of the transferred interference pattern signal, which is carried out by an interference output device. As a result, a real image of the display element to be displayed is output by the interference output device. The light wave interference can for example be generated by generating a plurality of light waves with the respective light wave parameters. Expressed differently, the interference output device can for example carry out a generation of a group of light waves and a setting of the respective, ascertained light wave parameter for each of the light waves.

The aforementioned advantages arise. The display element to be displayed can be displayed at different distances from and/or in different alignments with respect to the display area and hence be displayed in a space outside of the display and operating apparatus. As a result, the image representation of the display element can be represented, for example, closer to the user or further away from the user.

This has a very advantageous manifestation, in particular in conjunction with gesture control, since an operating region for operating a motor vehicle system by use of the display element with a display region, i.e. the spatial region in which the display element is displayed, can then be set individually. By way of example, the two regions can be arranged next to one another or close together or can at least partly overlap. These particular advantages are achieved by an embodiment of the method described herein in which the control device receives an operating signal from an operating device, for example a gesture recognition device, wherein the operating signal can describe an operating action, for example an operating gesture, of the user which is recognized by the operating device. In this case, an operating device is understood to be an appliance or an appliance component designed and set up to capture and recognize operating actions. To this end, for example, an operating device configured as a gesture recognition device can include, for example, a camera which is able to film the operating region, i.e. the region in which the user must carry out the example operating gesture so that the latter can be recognized as an operating gesture. Additionally, the example gesture recognition device can include suitable gesture recognition software.

On the basis of the provided operating signal, the control device establishes a change in a relative position and/or position of the real image of the display element, as described by the recognized operating action, and, on the basis of the described change in relative position and/or position, the control device adapts at least one light wave parameter for changing the interference pattern. Expressed differently, should, for example, an operating gesture for rotating an operating element shown in three dimensions be recognized, it is possible, for example, to ascertain or calculate the way in which the display element should rotate. To represent this rotation of the display element, the interference pattern can then be altered in such a way that a rotation of the display element is output.

In one development, the display element can display a position at which, during use of the display and operating device, a body part of the user can rest the display element against the display element, i.e. at which the body part can intersect a display plane of the displayed display element.

Optionally, a portion of the display element on which a body part of the user is arranged for the purposes of carrying out the operating action can be marked, i.e. graphically highlighted.

For example, the display region and the operating region can at least partly intersect or overlap, or lie next one another. To provide the user with a positioning aid, i.e. an aid so that the user knows the position at which they have to carry out the operating gesture so that the latter can be recognized by the gesture recognition device, it is possible, according to a further, example embodiment of the method described herein for there to be a generation of a field perceivable in a haptic and/or tactile fashion in and/or on the operating region. This operation can be carried out by a contact trigger device, which can for example be a device of the display and operating apparatus and/or of the operating device. A contact trigger device is understood to refer to an appliance or an appliance component for generating a physical quantity, wherein the physical quantity is suitable for triggering haptic and/or tactile feedback when incident on the skin of a user. Expressed differently, the contact trigger device can generate a field perceivable in a haptic and/or tactile fashion by way of the physical quantity, the field being located in the air and not being configured as a solid body.

To this end, the contact trigger device can be configured as an ultrasonic device, for example, i.e. as an appliance or appliance component for generating acoustic waves, for example ultrasonic waves. The decisive component part of such an ultrasonic device for generating the acoustic waves is a sound generator element in this case, which can for example be configured as a sound generator. Such a contact trigger device can generate a so-called "acoustic field".

As an alternative or in addition thereto, the contact trigger device can be configured, for example, as an airflow generating device, i.e. as an appliance or appliance component for generating an airflow or a blast of air. Such a contact trigger device can for example include an airflow generating element, i.e. a component part or a component part group for generating an airflow or an air pressure, for example by circulating, pumping or pressing air, or a plurality of directed airflows can be provided, which can meet at a location or at a point where tactile feedback should be implemented.

Feedback can be provided by the field perceivable in a haptic and tactile fashion. In a development in this respect, a vibration can for example be generated at a contact point between the body part and the display element, and/or a portion of the display element can be graphically highlighted at a contact point with the body part of the user. By way of example, the portion with the contact point can be represented in a thicker or denser or more opaque fashion than another portion of the display element.

In addition or as an alternative thereto, the contact trigger device can carry out a marking of a portion of the display element which includes the contact point. An optical positioning aid is thus provided for the user.

For example, the generated interference pattern signal can describe a configuration of an operating element or a configuration of an image of an operating element as a display element. In addition or as an alternative thereto, the generated interference pattern signal can describe a three-dimensional display element. The advantages of a three-dimensional configuration were already explained in detail above. The already above-described, advantageous operation of a system, for example of a motor vehicle system, can be implemented when the display element is configured as an operating element. For example, provision can be made for the generated interference pattern signal to be able to describe a plurality of three-dimensional display elements.

Optionally, there can be an additional generation of feedback, wherein the feedback can be, for example, one or more colors, and/or a size-related function, and/or a "click" noise, and/or haptic feedback in a motor vehicle seat, for example. The contacted portion or part of the display element or hologram can optionally be represented differently to a non-contacted portion, for example in a different color and/or in a different size and/or, for example, in pulsating fashion.

Aspects of the disclosure described above may be achieved by a control device which is characterized in that it is set up to carry out the method operations relating to the control device of a method according to any one of the preceding described embodiments. The aforementioned advantages arise. The control device can for example include a processor device, i.e. a component part or an appliance component for electronic data processing. The processor device can for example include at least one microcontroller and/or at least one microprocessor. Program code which, upon execution by the processor device, prompts the control device to carry out the above-described method operations of one or more of the embodiments of the method described herein in relation to the control device can be stored in a storage device, i.e. in a data memory. Optionally, the program code, upon execution by the processor device, can prompt the operating device and/or the contact trigger device to carry out the corresponding method operations.

Aspects of the disclosure described above may be achieved by a display and operating apparatus which includes an interference output device, wherein, on the basis of an interference pattern signal, the interference output device is configured to generate a group of light waves and set a respective light wave parameter. The display and operating apparatus includes an embodiment of the control device described herein. The aforementioned advantages arise. Optionally, the display and operating apparatus can include a contact trigger device for generating a field perceivable in haptic and/or tactile fashion in an operating region, wherein the contact trigger device can include at least one sound generator element and/or at least one airflow generating element. In the configuration with a sound generator element, the field perceivable in haptic and/or tactile fashion can be an acoustic field. The aforementioned advantages arise.

Optionally, the display and operating apparatus can include an operating device for capturing and recognizing an operating action in the operating region, for example a gesture recognition device. Here, too, the already mentioned advantages arise.

Aspects of the disclosure described above may be achieved by a motor vehicle which includes an embodiment of the display and operating apparatus described herein and/or an embodiment of the control device described herein. The motor vehicle is for example configured as an automobile, for example as a passenger automobile.

Aspects of the disclosure described herein include the combinations of the example embodiments described herein.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
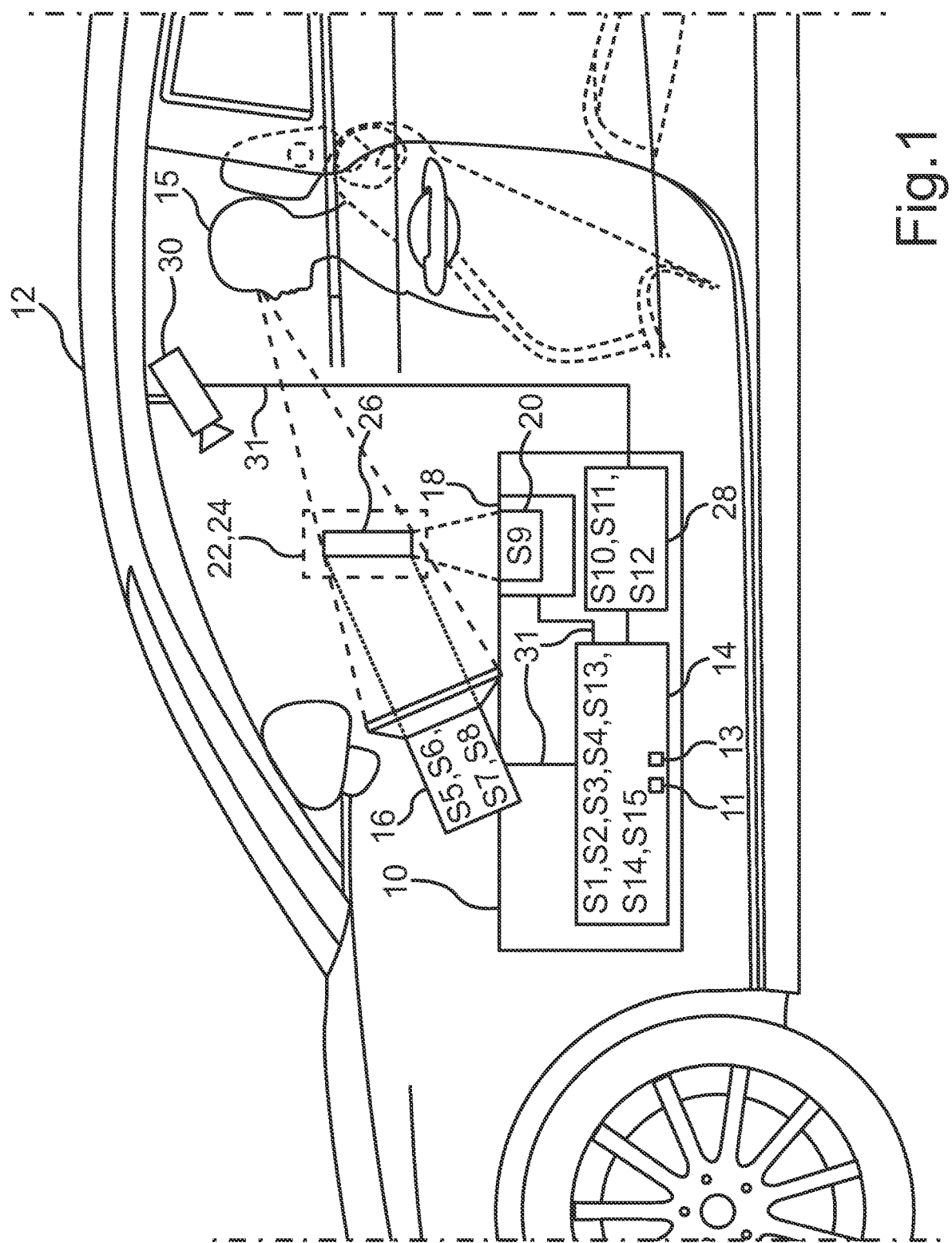
FIG. 1 is a schematic illustration of a first embodiment of the method described herein and the display and operating apparatus described herein.

Reference will now be made in detail to various examples which are illustrated in the accompanying drawings, wherein like reference characters refer to like elements throughout.

The example embodiments described below are merely examples. In the example embodiments, the described components of the embodiments each constitute individual features which are to be considered independently of one another, which also each develop the disclosure independently of one another, and which are thus also to be considered to be a component of the disclosure individually or in a combination other than the one depicted. Moreover, the embodiments described can also be supplemented with further features of the already described features.

In the drawings, functionally identical elements are each denoted by the same reference characters.

FIG. 1 elucidates the principle of the method described herein and of the display and operating apparatus 10 described herein on the basis of a first example embodiment. By way of example, the display and operating apparatus (device) 10 can be installed, for example, in a center console or in a control panel of a motor vehicle 12 in this case, wherein the motor vehicle can be configured as an automobile, for example. By way of example, the display and operating apparatus 10 can include an optional processor device 11 and an optional storage device 13, wherein the storage device 13 can be configured, for example, as a memory card or memory chip. Here, in the example of FIG. 1, both the processor device 11 and the storage device 13 are shown as optional constituent parts of the control device 14; however, both components can also be arranged outside of the control device 14. By way of example, the control device 14 can be configured as a control circuit board.

The example display and operating apparatus 10 of FIG. 1 includes an interference output device 16, which can for example include a holographic generator or a plurality of holographic generators. The interference output device 16 is configured and set up to generate light wave interference. To this end, the interference output device 16 can generate and output one or more light waves or light wave groups. The individual light waves or light wave groups can be varied in terms of their light wave parameters in such a way that two or more light waves can superpose. As an alternative or in addition thereto, the light waves or light wave groups can be steered in such a way that such a superposition can take place. Appropriate appliances are known to a person skilled in the art from the related art. The interferences, i.e. superpositions, generate one or more picture elements in front of the display area (not shown in FIG. 1) or therebehind. Expressed differently, a picture element arises where two or more light waves meet. As a result, an image arises by a combination of a plurality of points. In contrast to a hologram, the image of the interference output device 16 is not static.

Expressed differently, a light spot that can be actively controlled in space can arise where two or many high amplitudes of light waves meet. This control can be implemented in a three-dimensional and/or color-dependent fashion. In the process, these light spots or picture elements actually arise in space, i.e. these are not virtual points. Expressed differently, this relates to a real image. Advantageously, the picture elements can be actively controlled, and so moving pictures arise which, for example, may appear as real shining illuminants.

The example of FIG. 1 shows an optional contact trigger device 18 which can be configured, for example, to generate small blasts of air. Alternatively, the contact trigger device 18 can be configured as an ultrasonic device which may include a sound generator element 20. By way of example, the sound generator element 20 can be a membrane transmitter. Such a sound generator element can also be referred to as a sound generator or signal generator. For example, the sound generator element can include an arrangement or a matrix of a plurality of sound generators or signal generators, i.e. it can be configured as a so-called "signal generator array" or "sound generator array", for example as an ultrasonic array. Suitable appliance components or appliances for generating a field perceivable in haptic and tactile fashion, a so-called "acoustic field", are known to a person skilled in the art from the related art, for example from "Ultrahaptics". For example, the example sound generator element 20 can be an array of a plurality of ultrasonic sensors, which is used in park assist systems in the related art.

In the example of FIG. 1, the example sound generator element 20 can be aligned at an operating region 22, i.e. the region in which the user 15 must hold their hand, for example, so that an operating gesture can be recognized. As an alternative to the operation by way of an operating gesture, operation by way of, for example, a touchpad or a voice input or a rotary controller is also conceivable, which may be connected to the display and operating apparatus 10.

In the example of FIG. 1, the operating region 22 can correspond with a display region 24, or the operating region 22 can be, for example, disposed upstream of the display region 24, i.e. be located next to the display region 24 within which the interference output device 16 outputs the image, which can also be referred to as interference image.

By way of example, the object or display element 26 displayed in the display region can be an image of a rotary/push controller. By way of example, such an image of an operating element can be provided to set a function of an air-conditioning unit or for navigating through an operating menu.

In the case of the optional operation by an operating gesture, provision can be made for a gesture recognition device 28, which is shown in example fashion as a constituent part of the display and operating apparatus 10. By way of example, the gesture recognition device 28 can include a camera 30 arranged on a roofliner of the motor vehicle 12, or can be connected to such an example camera 30. Suitable appliance components and software for gesture recognition are known to a person skilled in the art from the related art. The example camera 30 is for example aligned at the operating region 22.

In combination with the acoustic field, the gesture recognition offers the advantage of, as already described further above, it being possible to exactly position a body part whose operating gesture is intended to be recognized. This improves the recognition of the gesture. In addition or as an alternative thereto, provision can be made, for example, for a user 15 to have to place their hand on a hand rest for operating purposes, for example on a touch-sensitive surface ("touchpad"). The gesture recognition device 28 can be set up to distinguish between, for example, an unwittingly moving hand which is "searching for" the operating region or a randomly moving hand, or an operating hand. As an alternative to the embodiment of the gesture recognition with the aid of the camera 30, a radar or an infrared camera, for example, can be used for gesture recognition.

In a first method operation S1, a graphical configuration of the example operating element can be specified, for example by providing three-dimensional graphics data. By way of example, these graphics data can be stored in the storage device 13 or, for example, can be retrieved from a vehicle-external data server (not shown in FIG. 1). The example graphics data can then be read. Within the scope of this example read-out process, it is possible to ascertain properties of the light waves and/or how the latter have to be deflected in order to generate the desired image of the operating element by way of light wave interference. By way of example, ascertaining one or more light wave parameters S2 can be based on empirical values or are read from the graphics file. Here, example light wave parameters can be an amplitude or a frequency or a wavelength. In a group of light waves generated by the interference output device 16, one or more light parameters can be ascertained for each of the light waves (S2) and the interference pattern can be established thus, for example on the basis of a preprogrammed specification. Expressed differently, the interference pattern can describe the image of the example operating element.

The control device 14 generates the interference pattern signal which describes this pattern and/or the respective light wave parameters (S3).

The generated interference pattern signal is transferred to the interference output device 16 (S4). Data communication connections 31 are shown as black connecting lines in FIG. 1 and can be configured, for example, for a wireless data transfer, for example as a WLAN or Bluetooth-LE connection. Alternatively, a data communication connection 31 can be wired, i.e., for example, configured as a cable or data bus.

The light waves are controlled by the interference output device 16 on the basis of the transferred interference pattern signal (S5), for the purposes of which, for example, specified light wave parameters can be set (S6). As a result of this, light wave interference is generated or provided (S7), i.e. the real image of the example operating element is output (S8).

If an acoustic field is generated by the optional contact trigger device 18 (S9), the user 15 is helped with finding the operating region 22. Upon incidence on the skin, the acoustic field triggers the feeling of contact and can consequently convey, for example, to the user 15 that their hand is situated in or on the operating region 22.

Figure 2:
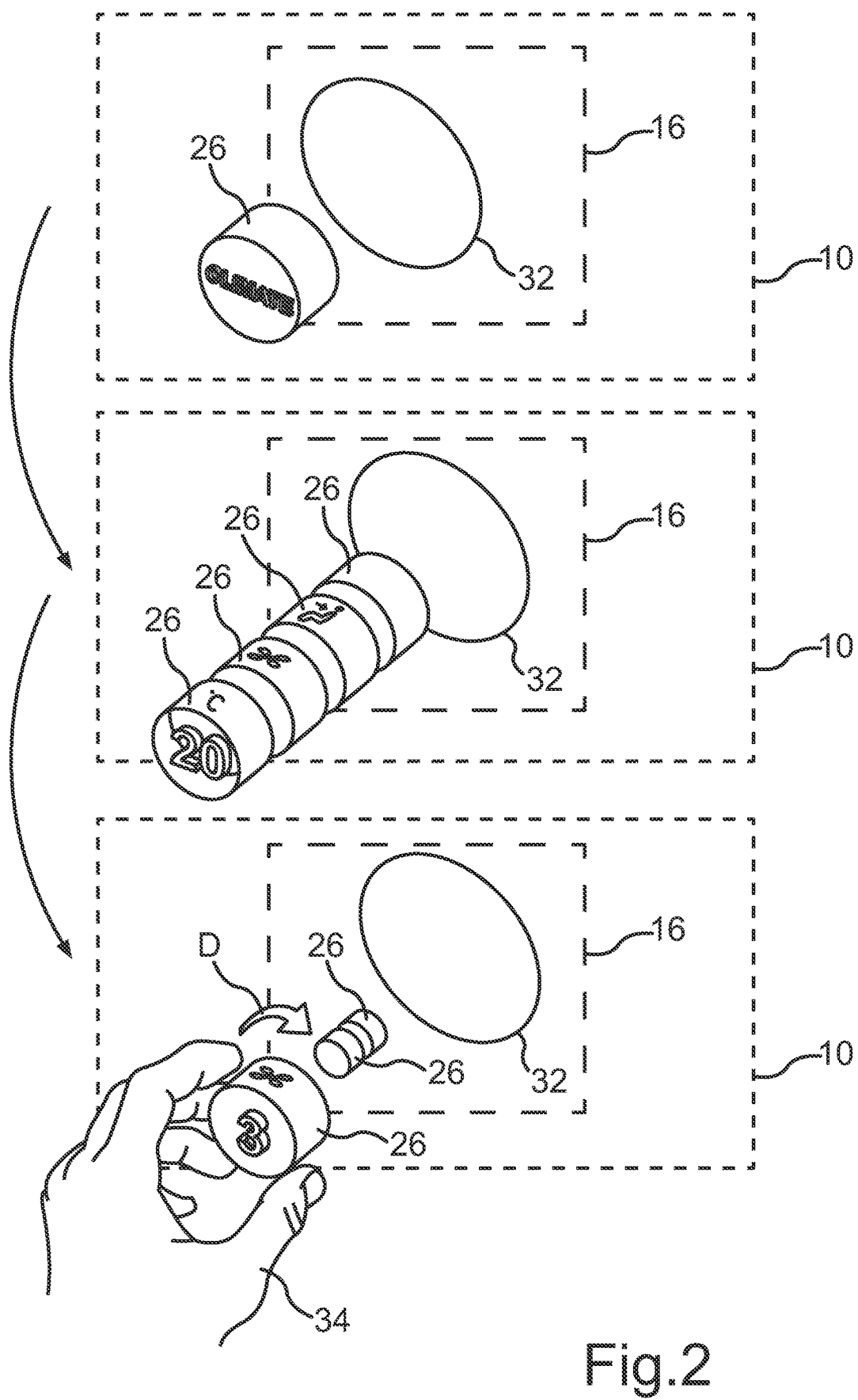
FIG. 2 is a schematic illustration of a further embodiment of the method described herein and the display and operating apparatus described herein.

FIG. 2 shows a further example embodiment of a display and operating apparatus 10 described herein, which may correspond to that from the example of FIG. 1, for example. For reasons of clarity, the example gesture recognition device 28 and the contact trigger device 18 are no longer shown here. It is for this reason that the control device 14 is no longer shown in the individual partial images of FIG. 2 either. Here, only differences to the functionality of FIG. 1 are discussed in the following.

The interference output device 16 of the example of FIG. 2 can include a display area 32, which can optionally be configured as a holographic screen ("holographic display"). On a side facing the user 15 in an example fashion, a round, disk-shaped display element 26, for example, can be displayed (upper part of FIG. 2).

The purpose of the display element 26 can be the selection of the air-conditioning function, for example. To trigger this function, provision can be made, for example, for the user 15 to be able to hold a hand (or finger(s)) 34 against or on the display element 26 for a certain amount of time, and/or, for example, carry out a tapping gesture or, for example, a swiping gesture. In the case of an example tapping gesture which uses two fingers, it is possible to effectively guard against or even avoid a mal-operation. Example alternative operating functions can be those of a navigation appliance or a radio, for example.

The gesture recognition device 28 can capture the operating gesture by use of an appropriate signal from the camera 30 (S10), and can recognize the gesture with the aid of the example gesture recognition software (S11).

For example, it is possible to provide an operating concept in which a plurality of subfunctions of the triggered function, the example air-conditioning unit operation, are provided by "grasping" and/or "tapping" the display element 26 (i.e. by a grasping gesture and/or by a tapping function) and, to this end, the individual display element 26 is replaced by four display elements 26 (central part of FIG. 2). Each of the example four display elements 26 can then be assigned a sub-function, for example setting a temperature, a fan power, a fan direction and an additional extra function. Expressed differently, the menu can "unfold".

A hand (or finger(s)) 34 of the user 15, which is currently able to carry out an operating gesture, is likewise shown. If the user 15 then uses the latter to operate the temperature setting, for example, by rotation with the aid of a rotary movement (D), the user is able to select and adjust a specific temperature within the temperature menu. In this case, the currently active sub-function can be presented by a display element 26 that is larger than the two further display elements 26 which can represent the other sub-functions (lower part of FIG. 2).

Here, it is possible to assign the assignment of the operating gesture to the "rotated" display element 26, and hence to the function to be activated, for example on the basis of the camera image. The gesture recognition device 28 can generate an operating signal (S12), which can describe the operating gesture and/or the function to be triggered. This allows the generated operating signal to be provided (S13).

By way of example, if the example operating gesture describes a rotary movement D, it is possible to establish a corresponding rotary movement of the display element 26 (S14). Optionally, provision can be made for the gesture recognition to be able to capture a length of the rotary movement, for example, and be able to adapt a corresponding visually displayed rotary movement of the display element 26.

The light wave parameters can be adapted (S15) for this in such a way that the interference pattern changes in such a way that the image of the display element 26 rotates.

Figure 3:
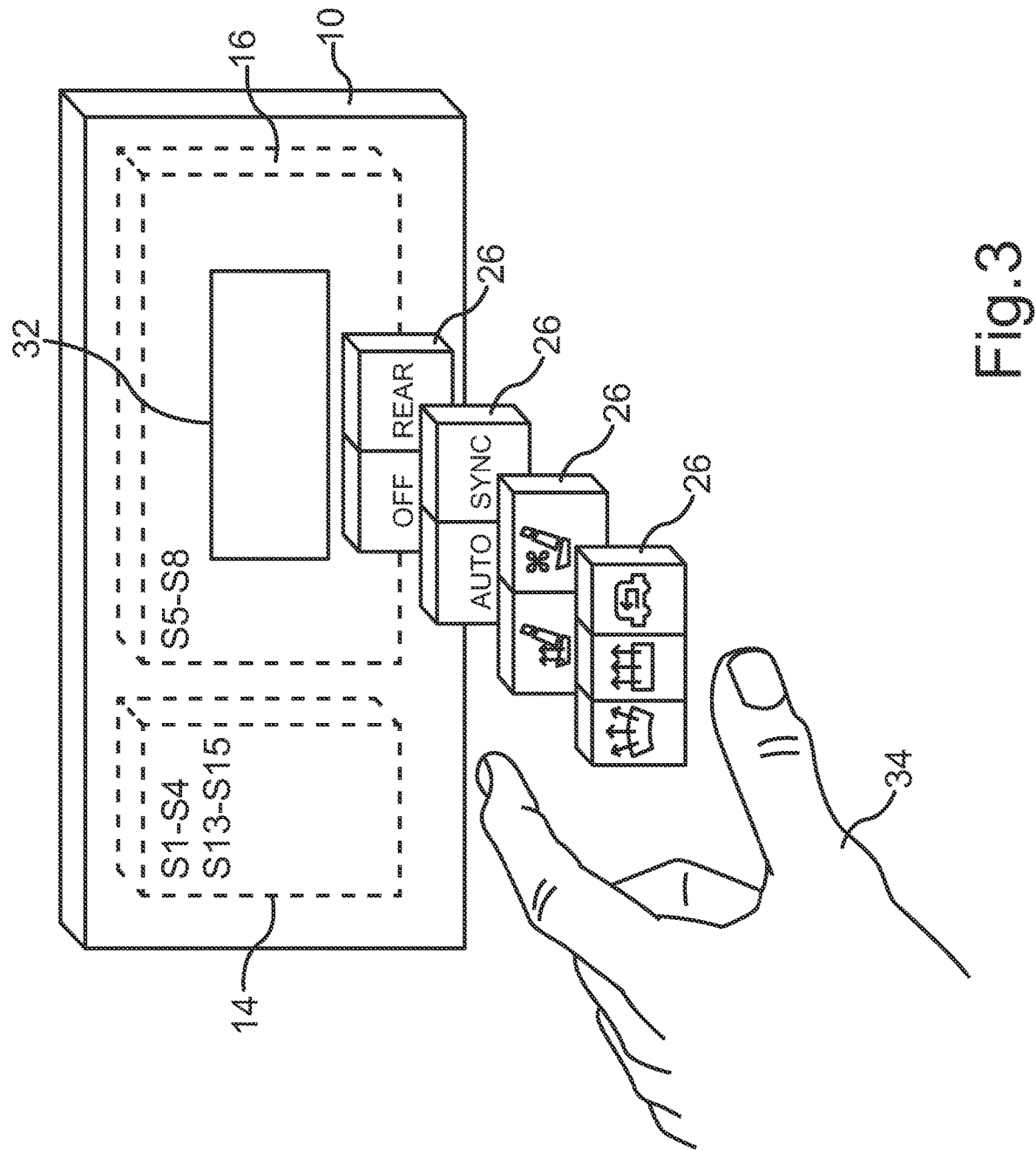
FIG. 3 is a schematic illustration of a further embodiment of the method described herein and the display and operating apparatus described herein.

FIG. 3 shows a further example embodiment relating to a further operating concept. In order to provide a better overview, not all of the individual components of the display and operating apparatus 10 are illustrated. However, in principle, the display and operating apparatus 10 of FIG. 3 can be a display and operating apparatus 10 of FIG. 1, for example. The operating concept of FIG. 3 can optionally be combinable with the operating concept of FIG. 2.

FIG. 3 shows an example display area 32, which can optionally be referred to as holographic display or as interferometric display. By way of example, the interference output device 16 can display four display elements 26, wherein each of the display elements can have two or more regions and different operating functions can be assigned to the respective regions. Here, the individual functions can be operated by, for example, a tapping or swiping gesture.

Figure 4:
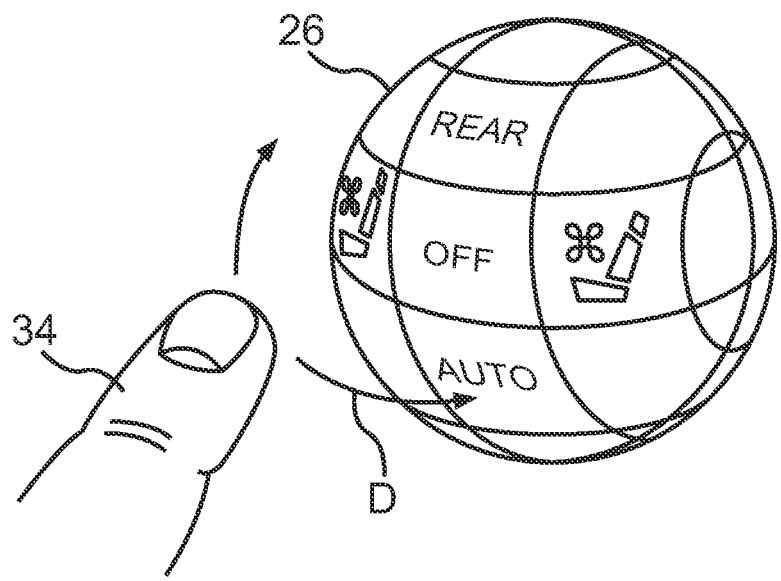
FIG. 4 is a schematic illustration of a further embodiment of the method described herein and the display and operating apparatus described herein.
Figure 5:
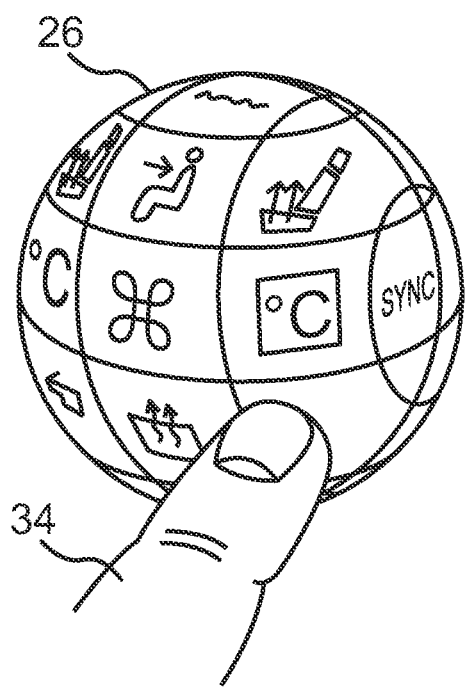
FIG. 5 is a schematic illustration of a further embodiment of the method described herein and the display and operating apparatus described herein.
Figure 6:
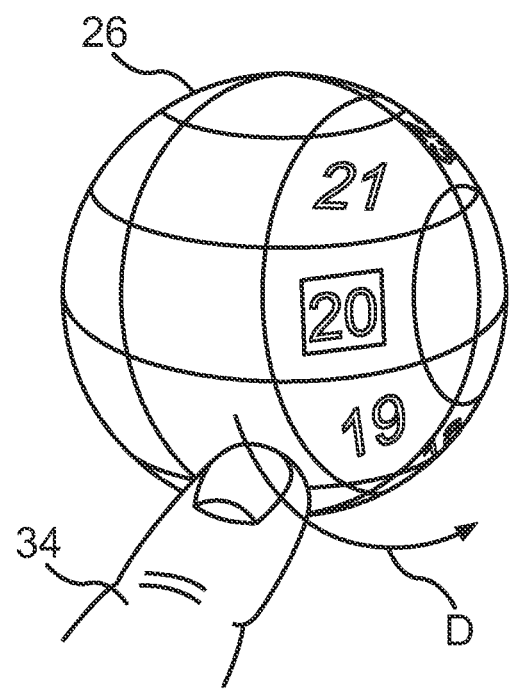
FIG. 6 is a schematic illustration of a further embodiment of the method described herein and the display and operating apparatus described herein.

FIG. 4, FIG. 5 and FIG. 6 show an operating concept with a display element 26 configured in an example spherical fashion, which can be rotated in three dimensions in space. A possible conversion of a rotary gesture into a rotary movement of the display element 26 has already been described further above. The spherical operating element as display element 26 can be subdivided, for example, into different regions, which can each have assigned a function of a motor vehicle system. As a result of the three-dimensional configuration, different so-called functional regions can be present both on the front side and on the rear side. By way of, for example, a pressing gesture on a corresponding functional region, it is possible to trigger a function, wherein the spherical display element 26 can be rotated in the case of a rotary gesture D. If the different functional regions are labeled, for example, by an image, writing or an image of a symbol, these symbols or labels can also rotate with the functional region when the display element 26 rotates.

By way of example, functions for a motor vehicle seat can be provided in the example of FIG. 4, for example the sub-functions "rear", "off" and "auto". By way of example, these operating functions can serve to select an air-conditioning state for the back seat, a switch-off or an automatic setting. Other function regions can be displayed in the case of a virtual rotation of the display element 26. If the display element 26 is rotated (FIG. 5), it is possible, for example, to provide functions for ventilation or for a temperature setting.

FIG. 6 shows a configuration of the spherical display element 26, which can be configured as a roller, for example, after, for example, setting a temperature by, for example, a push gesture (FIG. 5).

Optionally, provision can be made for the provision of a so-called learning phase for getting used to the operating concept, within the scope of which the user 15 can learn to operate the display and operating apparatus described herein. Thus, the user 15 can train their motor memory and, for example, learn an optimum speed for rotating a display element 26, or learn where a certain function can be on the display element 26. For learning purposes, haptic feedback, for example, can be generated by the contact trigger device 18 in order to assist the user 15 with the learning.

Optionally, provision can be made for the display element 26 or a plurality of display elements 26 to be able to be adjustable for a front passenger, for example. In the process, it is possible to alter the position and/or the relative position of the display element 26, for example for as long as it can be visible within a sight cone. By way of example, if the display and operating apparatus 10 is in a control panel of a motor vehicle 12, the display element 26 can be positioned for a driver in such a way that the latter's gaze can fall on the display area 32 in perpendicular fashion. Expressed differently, the display area 32 can be aligned on the user 15. In the case of a large display and operating apparatus 10, a plurality of occupants, for example, can see simultaneously the display area 32 and/or the display element 26. By way of example, a position and/or relative position can be manually adjustable by the user 15. As a result, the display and operating apparatus 10 has a very ergonomic design.

Overall, the example embodiments elucidate a holographic operating concept which can be based on a virtual 3D body and by use of which it is possible to navigate on this body by use of an input medium or operating element such as, for example, a rotary/push controller or touch pad, by way of, for example, gesture recognition.

According to a further example embodiment (FIG. 2), the interference output device 16, which can optionally include a holographic generator, can generate 3D images in front of a display area 32 with the aid of the example holographic generator. For example, by way of a gesture recognition, it is possible, for example, to "grasp" and operate a menu. Potentially, this can be supplemented by haptics, for example by blasts of air or ultrasound. By way of example, the user 15 can initially see a three-dimensional body for, for example, to set ambient conditions. By way of example, by grasping (or a grasping gesture), this body of the display element 26 can unfold into a plurality of bodies, i.e. into a plurality of display elements 26, which can each display or represent a function. By way of example, it is possible to alter, for example, a value by grasping and/or selecting.

According to a further example embodiment, FIG. 3 describes objects or display elements 26 that appear to "float" in the air. Here, the picture elements are real and not virtual. Here, alternatively, the display elements 26 can be represented as "sheets", for example for different media or contacts, through which the user 15 can scroll with a "scroll gesture". Each of the display elements 26 can optionally have a text field with a menu text (for example: "est leucocyte", "est sushi in shoeshop", "est goldwrap", "est dodge the dodo", "est strange phase").

FIG. 4, FIG. 5 and FIG. 6 show a sphere as a display element 26 for a further example embodiment, which sphere is able to, for example, "float in the air" with all air-conditioning functions (FIG. 4). By way of example, the side of the display element 26 shown in FIG. 4 can be a back side. In this respect, FIG. 5 shows, in example fashion, a corresponding front side and a function can be searched for by, for example, rotating and/or grasping.

In this respect, FIG. 6 shows a selection and adjustment of a value in example fashion.

Expressed differently, the example sphere can actually "float" in three-dimensional fashion in space, and functions can likewise be displayed on a back side, for example. Thus, a plurality of functions can be imaged in a small space.

According to a further example embodiment, functions can be operated blindly following a learning phase, for example using an input instrument. By way of example, a seat heater can be selected and/or set using three click gestures to the right and one click gesture in the upward direction.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method of operating a display and operating device in a vehicle, the method comprising:
   by a control device configured to receive and evaluate signals and to generate control signals, including,
      specifying a graphical configuration of a group of display elements corresponding to an operating element of the vehicle and at least one operating sub-function of the operating element to be displayable in response to at least one operating action to replace the operating element with at least one three-dimensional shape, from among three-dimensional shapes of a stack and a sphere, with regions corresponding to the at least one operating subfunction, a region of the regions being selectable by at least one operating action, from among operating actions of a rotary gesture, a pressing gesture, a tapping gesture, and swiping gesture;
   based on the graphical configuration,
      ascertaining at least one light wave parameter, from among light wave parameters that respectively describe a physical property of a respective light wave of a group of light waves, each light wave parameter of the light wave parameters respectively describing the physical property of a frequency, an amplitude, and a wavelength of the respective light wave, and ascertaining a totality of the light wave parameters that describe an interference pattern of the graphical configuration based on the at least one light wave parameter, so that at least a partial superposition of the group of light waves is described to generate an image representation of the operating element;

generating a first signal that describes the totality of the light wave parameters of the interference pattern describing the image representation of the operating element in the vehicle;

transferring the first signal that describes the totality of the light wave parameters of the interference pattern to an interference output device;

by the interference output device, generating and outputting the group of light waves based on the first signal that describes the totality of the light wave parameters of the interference pattern of the graphical configuration by setting the at least one light wave parameter for each light wave, from among the group of light waves, so as to generate a light wave interference to display a first display element of the group of display elements at a position reachable by a body part of a user in the vehicle to intersect a display plane of the operating element to select the operating element by the at least one operating action;

receiving an operating signal from an operating device, the operating signal describing an operating action, from among the at least one operating action, by the user with respect to a selection of the at least one operating subfunction;

establishing a change in a relative position and/or a position in the first display element to indicate the selection of the at least one operating subfunction, based on the operating signal; and in response to the operating action with respect to the at least one operating subfunction, adapting at least one light wave parameter, from among the light wave parameters, for at least one light wave, from among the group of light waves, to change the first signal that describes the totality of the light wave parameters of the interference pattern of the graphical configuration to a second signal that describes a totality of light wave parameters for a changed interference pattern of the graphical configuration, to generate a second display element of the group of display elements to replace the operating element with at least one three-dimensional shape, from among three-dimensional shapes of the stack and the sphere, based on the change in the relative position and/or the position in the first display element, so that a position at which a body part of the user intersects the display plane is represented in form of the at least one operating action, from among the operating actions of a rotary gesture, a pressing gesture, a tapping gesture, and swiping gesture against a region of the regions of the at least one three-dimensional shape to indicate the selection of the at least one operating subfunction.

2. The method according to claim 1, further comprising: generating, by a contact trigger device of the display and operating device, a field perceivable in a haptic and tactile fashion in and/or on the region reachable by the body part of the user in the vehicle for performing the operating action with respect to the first display element.

3. The method according to claim 2, wherein the generating of the field perceivable in the haptic and tactile fashion is performed by generating a vibration at a contact point of the body part and the first display element and/or by graphically highlighting a portion of the first display element at the contact point of the body part and the first display element.

4. The method according to claim 1, wherein
the operating device includes a gesture recognition device, and
the operating action by the user is an operating gesture recognized by the gesture recognition device.

5. The method according to claim 4, wherein
the operating gesture includes a rotary movement of a body part of the user, and
the adapting of the at least one light wave parameter for the at least one light wave to change the interference pattern causes the first display element to be rotated in accordance with the rotary movement of the body part of the user.

6. A control device for a display and operating device in a vehicle, the control device comprising:
a memory to store instructions; and
a processor to execute the instructions stored in the memory to:
specify a graphical configuration of a group of display elements corresponding to an operating element of the vehicle and at least one operating subfunction of the operating element to be displayable in response to at least one operating action to replace the operating element with at least one three-dimensional shape, from among three-dimensional shapes of a stack and a sphere, with regions corresponding to the at least one operating subfunction, a region of the regions being selectable by at least one operating action, from among operating actions of a rotary gesture, a pressing gesture, a tapping gesture, and swiping gesture,
based on the graphical configuration,
ascertain, at least one light wave parameter, from among light wave parameters that respectively describe a physical property of a respective light wave of a group of light waves, each light wave parameter of the light wave parameters respectively describing the physical property of a frequency, an amplitude, and a wavelength of the respective light wave, and
ascertain a totality of the light wave parameters that describe an interference pattern of the graphical configuration based on the at least one light wave parameter, so that at least a partial superposition of the group of light waves is described to generate an image representation of the operating element;
generate a first signal that describes the totality of the light wave parameters of the interference pattern describing the image representation of the operating element in the vehicle,
transfer the first signal that describes the totality of the light wave parameters of the interference pattern to an interference output device, so that the interference output device is to generate and output the group of light waves based on the first signal that describes the totality of the light wave parameters of the interference pattern by, setting the at least one light wave parameter for each light wave, from among the group of light waves, so as to generate a light wave interference to display a first display element of the group of display elements at a position reachable by a body part of a user in the vehicle to intersect a display plane of the operating element to select the operating element by the at least one operating action, receive an operating signal from an operating device, the operating signal describing an operating action, from among the at least one operating action, by the user with respect to a selection of the at least one operating subfunction, establish a change in a relative position and/or a position in the first display element to indicate the selection of the at least one operating subfunction, based on the operating signal, and in response to the operating action with respect to the at least one operating subfunction, adapt at least one light wave parameter, from among the light wave parameters, for at least one light wave, from among the group of light waves, to change the first signal that describes the totality of the light wave parameters of the interference pattern of the graphical configuration to a second signal that describes a totality of light wave parameters for a changed interference pattern of the graphical configuration, to generate a second display element of the group of display elements to replace the operating element with at least one three-dimensional shape, from among three-dimensional shapes of the stack and the sphere, based on the established-change in the relative position and/or the position in the first display element, so that a position at which a body part of the user in intersects the display plane is represented in form of the at least one operating action, from among the operating actions of a rotary gesture, a pressing gesture, a tapping gesture, and swiping gesture against to indicate selection of the at least one operating subfunction.

7. A motor vehicle, comprising:
a chassis; and
the control device of claim 6.

8. The motor vehicle according to claim 7, further comprising:
a vehicle system including at least one system from among a climate system, navigation system, or entertainment system,
wherein the operating element represents the at least one system and the operating action by the user with respect to the first display element is to select or change a function or setting of the vehicle system.

9. A display and operating device of a vehicle, comprising:
an interference output device to, based on a first signal for an interference pattern, generate and output a group of light waves and set a respective at least one light wave parameter, from among light wave parameters, for each light wave from the group of light waves, so as to generate a light wave interference and output a first display element; and a control device to:
specify a graphical configuration of a group of display elements corresponding to an operating element of the vehicle and at least one operating subfunction of the operating element to be displayable in response to at least one operating action to replace the operating element with at least one three-dimensional shape, from among three-dimensional shapes of a stack and a sphere, with regions corresponding to the at least one operating subfunction, a region of the regions being selectable by at least one operating action, from among operating actions of a rotary gesture, a pressing gesture, a tapping gesture, and swiping gesture, based on the graphical configuration,
ascertain, at least one light wave parameter, from among the light wave parameters that respectively describe a physical property of a respective light wave of the group of light waves, each light wave parameter of the light wave parameters respectively describing the physical property of a frequency, an amplitude, and a wavelength of the respective light wave, and ascertain a totality of the light wave parameters that describe an interference pattern of the graphical configuration based on the at least one light wave parameter, so that at least partial superposition of the group of light waves is described to generate an image representation of the operating element, generate the first signal that describes the totality of the light wave parameters of the interference pattern describing the image representation of the operating element in the vehicle, transfer the first signal that describes the totality of the light wave parameters of the interference pattern to the interference output device, so that the interference output device is to generate and output the group of light waves based on the first signal that describes the totality of the light wave parameters of the interference pattern by, setting the at least one light wave parameter for each light wave, from among the group of light waves, so as to generate the light wave interference to display a first display element of the group of display elements at a position reachable by a body part of a user in the vehicle to intersect a display plane of the operating element to select the operating element by the at least one operating action, receive an operating signal from an operating device, the operating signal describing an operating action, from among the at least one operating action, by the user with respect to a selection of the at least one operating subfunction, establish a change in a relative position and/or a position in the first display element to indicate the selection of the at least one operating subfunction, based on the operating signal, and in response to the operating action with respect to the at least one operating subfunction, adapt at least one light wave parameter, from among the light wave parameters, for at least one light wave, from among the group of light waves, to change the first signal that describes the totality of the light wave parameters of the interference pattern of the graphical configuration to a second signal that describes a totality of light wave parameters for a changed interference pattern of the graphical configuration, to generate a second display element of the group of display elements to replace the operating element with at least one three-dimensional shape, from among three-dimensional shapes of the stack and the sphere, based on the change in the relative position and/or the position in the first display element, so that a position at which a body part of the user intersects the display plane is represented in form of the at least one operating action, from among the operating actions of a rotary gesture, a pressing gesture, a tapping gesture, and swiping gesture against to indicate selection of the at least one operating subfunction.

10. The display and operating device according to claim 9, further comprising a contact trigger device to generate a field perceivable in a haptic and a tactile fashion in and/or on the region reachable by the body part of the user for performing the operating action with respect to the first display element, the contact trigger device including at least one airflow generating element.

11. The display and operating device according to claim 9, further comprising the operating device,
wherein the operating device includes a gesture recognition device to capture and recognize the operating action in the region reachable by the body part of the user for performing the operating action with respect to the first display element.

12. A motor vehicle, comprising:
a chassis; and
the display and operating device of claim 9.

13. The motor vehicle according to claim 12, further comprising:
a vehicle system including at least one system from among a climate system, navigation system, or entertainment system,
wherein the operating element represents the at least one system and the operating action by the user with respect to the first display element is to select or change a function or setting of the vehicle system.

14. The motor vehicle according to claim 13, wherein the display and operating device further comprises a contact trigger device to generate a field perceivable in a haptic and a tactile fashion in the region reachable by the body part of the user for performing the operating action with respect to the first display element.

15. The motor vehicle according to claim 13, wherein
the display and operating device further comprises the operating device, and
the operating device includes a gesture recognition device to capture and recognize the operating action in the region reachable by the body part of the user for performing the operating action with respect to the first display element.

* * * * *

UNITED STATES PATENT AND TRADEMARK OFFICE
CERTIFICATE OF CORRECTION

| | | |
|---|---|---|
| PATENT NO. | : 11,921,932 B2 | |
| APPLICATION NO. | : 17/251653 | |
| DATED | : March 5, 2024 | |
| INVENTOR(S) | : Jacques Helot | |

It is certified that error appears in the above-identified patent and that said Letters Patent is hereby corrected as shown below:

In the Claims

Column 15, Line 40:
In Claim 6, delete "established-change" and insert --change--.

Column 15, Line 43:
In Claim 6, delete "user in" and insert --user--.

Signed and Sealed this
Seventh Day of May, 2024

Katherine Kelly Vidal
*Director of the United States Patent and Trademark Office*